(12) United States Patent
Martinelli et al.

(10) Patent No.: US 10,451,762 B2
(45) Date of Patent: Oct. 22, 2019

(54) DIRECT FLUID INDICATORS IN MULTIPLE SEGMENT PROSPECTS

(71) Applicant: Schlumberger Technology Corporation, Sugar Land, TX (US)

(72) Inventors: Gabriele Martinelli, Asker (NO); Charles Stabell, Oslo (NO); Espen Langlie, Asker (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 734 days.

(21) Appl. No.: 14/776,692

(22) PCT Filed: Mar. 12, 2014

(86) PCT No.: PCT/US2014/023855
§ 371 (c)(1),
(2) Date: Sep. 14, 2015

(87) PCT Pub. No.: WO2014/159479
PCT Pub. Date: Oct. 2, 2014

(65) Prior Publication Data
US 2016/0018550 A1    Jan. 21, 2016

Related U.S. Application Data

(60) Provisional application No. 61/781,723, filed on Mar. 14, 2013.

(51) Int. Cl.
*G01V 1/50*    (2006.01)
*G01V 1/30*    (2006.01)

(52) U.S. Cl.
CPC . *G01V 1/50* (2013.01); *G01V 1/30* (2013.01)

(58) Field of Classification Search
CPC .................................. G01V 1/50; G01V 1/30
(Continued)

(56) References Cited

U.S. PATENT DOCUMENTS 4,249,422 A * 2/1981 Gaunaurd .............. G01N 29/12
73/589
7,210,342 B1 * 5/2007 Sterner ................... E21B 21/01
73/152.18
(Continued)

FOREIGN PATENT DOCUMENTS

WO        2011149609 A1    12/2011

OTHER PUBLICATIONS

Martinelli, et al., "Dynamic Decision Making for Graphical Models Applied to Oil Exploration", Jan. 20, 2012, arxiv.org, Cornell University Library, 201 Olin Library Cornell University, Ithaca, NY, 22 pages.
(Continued)

*Primary Examiner* — Igwe U Anya

(57) ABSTRACT

Methods, systems, and computer-readable media for determining a chance of success for a prospect including two or more segments. The method may include receiving seismic data indicative of a plurality of anomalies in a prospect. The prospect may include a plurality of segments. Prior probabilities of success and failure scenarios may be computed for at least one of the segments of the prospect. Likelihoods of the anomalies may be determined given the success and failure scenarios for the at least one of the segments. At least two of the segments may be classified into a direct fluid indicator dependency group. A degree of correlation may be determined between the anomalies for the direct fluid indicator dependency group. A posterior chance of success may be determined for the prospect based at least in part on the degree of correlation between the anomalies.

38 Claims, 8 Drawing Sheets

(58) Field of Classification Search
USPC .......................................................... 702/14
See application file for complete search history.

(56) References Cited

U.S. PATENT DOCUMENTS

| | | | |
|---|---|---|---|
| 2005/0240348 A1* | 10/2005 | Knight | ................... G01V 11/00 |
| | | | 702/2 |
| 2011/0083844 A1* | 4/2011 | Oppert | ..................... G01V 1/30 |
| | | | 166/250.15 |
| 2011/0119040 A1* | 5/2011 | McLennan | .............. G06F 17/18 |
| | | | 703/2 |
| 2011/0292764 A1 | 12/2011 | Kelly | |
| 2014/0129147 A1* | 5/2014 | Zhang | ................... E21B 49/088 |
| | | | 702/8 |
| 2014/0330523 A1* | 11/2014 | Trybek | ..................... G01V 1/28 |
| | | | 702/16 |

OTHER PUBLICATIONS

Martinelli, et al., "SPE 159722 Strategies for petroleum exploration based on Bayesian Networks: a case study", Oct. 10, 2012, SPE Annual Technical Conference and Exhibition, 14 pages.
Stabell, et al., "Bayesian Risk Modification for Seismic Anomalies and Multiple Segment Prospect", Jul. 4, 2012, SEG/San Antonio 2007 Annual Meeting, pp. 4-7.
Extended European Search Report issued in related EP application 14775039.2 dated Jun. 21, 2016, 8 pages.

* cited by examiner

| ◄ Initial risk assessment | Initial Fluids & Reservoir Probabilities | DFI Asse |

| DFI is applicable in segment
| HC phase risking

| Risk factor | P(play) | P(segment | pl... |
|---|---|---|
| Trap and Seal | 1.000 | 0.300 |
| Reservoir Presence | 1.000 | 0.500 |
| Reservoir Quality | 1.000 | 0.800 |
| Source and Migration | 1.000 | 0.600 |
| > Marginal play probability | 1.000 | |
| > Conditional segment probability | | 0.072 |
| > Unconditional probability | | 0.072 |
| > Dry hole risk | | 0.928 |

FIG. 2

| ◄ Initial risk assessment | Initial Fluids & Reservoir Probabilities | DFI Asse |

| Case | Probability | Justification |
|---|---|---|
| Failure hydrocarbons | | |
| Failure Oil | 0.000 | |
| | | |
| Other failure types | | |
| Water | 1.000 | |
| Low Sat. Gas | 0.000 | |
| Other fluid | 0.000 | |
| Sum | 1.000 | |
| | | |
| Reservoir & non reservoir | | |
| Eval. Res. | 0.400 | |
| Non Eval. Res. | 0.100 | |
| Non Res. | 0.500 | |
| Sum | 1.000 | |
| | | |
| Non reservoir sub division | | |
| Non Res. 1 | 1.000 | |
| Non Res. 2 | 0.000 | |
| Non Res. 3 | 0.000 | |
| Sum | 1.000 | |

FIG. 3

| Initial risk assessment | Initial Fluids & Reservoir Probabilities | DFI Assessment | Success Summary Graph | DFI Modified risk | | |
|---|---|---|---|---|---|---|
| Label | P(DFI \| case) | P(case, success) | P(case, failure) | P(case & DFI) | P(case \| DFI) |
| Oil & Eval. Res. | 0.800 | 0.072 | | 0.058 | 0.130 |
| Oil & Non. Eval. Res. | 0.600 | | 0.018 | 0.011 | 0.024 |
| Water & Eval. Res. | 0.300 | | 0.328 | 0.098 | 0.223 |
| Water & Non. Eval. Res. | 0.300 | | 0.082 | 0.025 | 0.056 |
| Water & Non Res. 1 | 0.500 | | 0.500 | 0.250 | 0.566 |
| | | | | | |
| Overall success | | 0.800 | 0.072 | | 0.058 | 0.130 |
| Overall failure | | 0.414 | 0.928 | 0.384 | 0.870 |
| Overall | | 0.441 | | 0.441 | 1.000 |

FIG. 4

DIRECT FLUID INDICATORS IN MULTIPLE SEGMENT PROSPECTS

BACKGROUND

Seismic indicators or anomalies such as flat spots, conformance, and amplitude versus offset ("AVO") have been used in recent years to improve the estimation of the chance of success ("COS") of segments and prospects. A "segment" generally refers to a discrete exploration target, and a prospect refers to a collection of segments. The "prospect chance of success" generally is the chance that at least one segment succeeds (i.e., has hydrocarbons) assuming that each of the segments in the prospect is drilled.

Several methods exist to handle these anomalies. At least one approach employs Bayesian Risk Modification ("BRM"). This approach allows the exploration team to take into account anomalies that increase the chance of success of a segment, and "false positive" anomalies, i.e., anomalies that are caused by a particular fluid condition inside the reservoir and that may be mistaken for hydrocarbon indicators. For this reason, these signals are generally regarded as direct fluid indicators ("DFIs") and not as direct hydrocarbon indicators ("DHIs").

A challenge when dealing with seismic anomalies is how the seismic information in multi-segment prospects should be valued.

SUMMARY

Systems, methods, and computer-readable media are disclosed, which may be implemented for determining a chance of success for a prospect including a plurality of segments. For example, the method may include receiving seismic data indicative of a plurality of anomalies in a prospect. Prior probabilities of success and failure scenarios may be computed for at least one of the segments included in the prospect. Likelihoods of the anomalies may be determined given the success and failure scenarios for the at least one of the segments included in the prospect. The segments may be classified into different direct fluid indicator dependency groups. A degree of correlation may be determined between the anomalies for the of the direct fluid indicator dependency group. A posterior chance of success may be determined for the prospect based at least in part on the degree of correlation between the anomalies.

It will be appreciated that the foregoing summary is merely intended to introduce a subset of the subject matter discussed below and is, therefore, not limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIG. 2 illustrates an initial risk assessment display, according to an embodiment.

FIG. 3 illustrates an initial fluids and reservoir probabilities display, according to an embodiment.

FIG. 4 illustrates a DFI assessment display, according to an embodiment.

FIG. 5-1 illustrates a graph showing Optimal k vs. P(shared) for COS(A)=0.6 and COS(B)=0.3, according to an embodiment.

FIG. 5-2 illustrates a graph showing Optimal k vs. P(shared) for COS(A)=0.6 and COS(B)=0.6, according to an embodiment.

DETAILED DESCRIPTION

Figure 1:
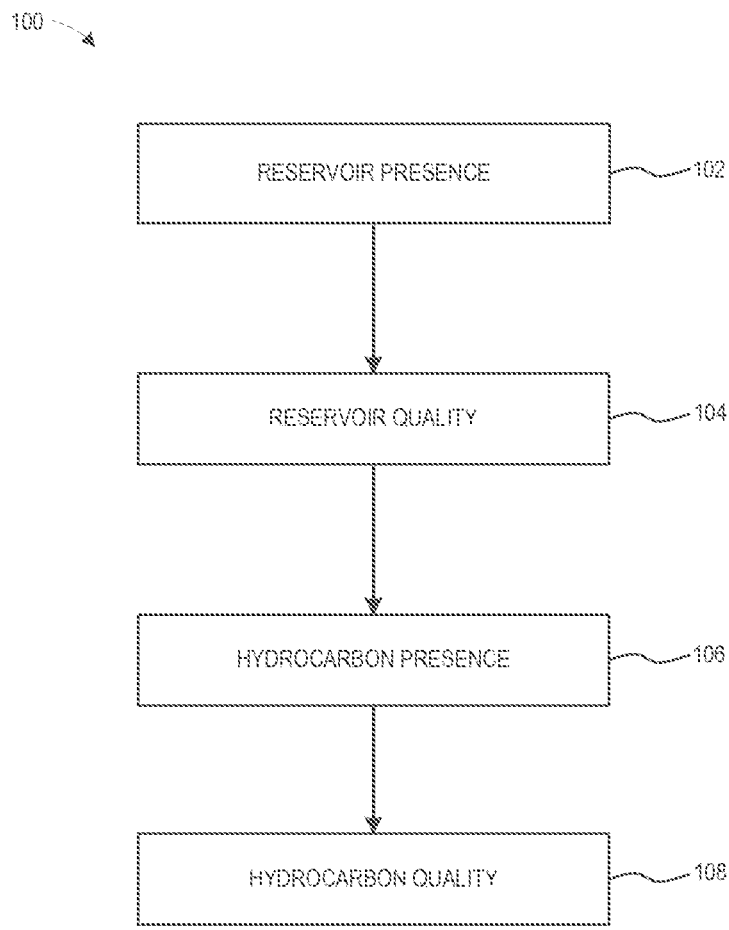
FIG. 1 illustrates a hierarchical chain with four risk groups, according to an embodiment.

The following detailed description refers to the accompanying drawings. Wherever convenient, the same reference numbers are used in the drawings and the following description to refer to the same or similar parts. While several embodiments and features of the present disclosure are described herein, modifications, adaptations, and other implementations are possible, without departing from the spirit and scope of the present disclosure.

The methodology disclosed herein may be generic and valid for any kind of anomaly, whether seismic, EM (electromagnetic), or of other kind In the following, examples seismic anomalies are considered, since this may be one example of use of the technology; however, there is neither reason nor intent to limit the scope of the disclosure to such an implementation.

As part of a Bayesian Risk Modification ("BRM") approach, a range of hypotheses concerning segment or prospect conditions may be developed and may lead to observed seismic indicators and/or anomalies. These hypotheses are then quantified into different "likelihood values." A "likelihood value" generally refers to the probability that the observed anomaly exists given a success or a failure scenario. The terms "Scenario" and "Case" may be used herein in an interchangeable manner. The observed anomaly becomes a new piece of information that is used to update the prior estimate of chance of success ("COS") and volume based on the original geological and geophysical considerations. Likelihood values and prior estimates are combined following a Bayesian framework that states that the posterior COS is proportional to the prior estimate multiplied by the likelihood calculated from the data, e.g.:

$$P(\text{Oil}|\text{Anomaly}) = P(\text{Anomaly}|\text{Oil}) * P(\text{Oil})/P(\text{Anomaly}).$$

Using a computer program such as, for example, GEOX software (developed and distributed by SCHLUMBERGER), the user may implement a segment analysis. Considering a single segment, the COS of geological elements in the segment may be assigned certain risk factors by geologists. The product of these risk factors may determine the COS of the segment. This quantity may be referred to as "prior COS," ignoring any anomalies. In Table 1 below, "reservoir presence," "reservoir quality," and "source and migration" are confirmed, while there may be an uncertainty about the presence or the effectiveness of the "trap and seal". In this example, the prior COS is equal to 0.1.

TABLE 1

| Risk factor | P (play) | P (segment\|play) |
|---|---|---|
| Trap and seal | 1.0 | 0.1 |
| Reservoir presence | 1.0 | 1.0 |
| Reservoir quality | 1.0 | 1.0 |
| Source and migration | 1.0 | 1.0 |

When starting the direct fluid indicator ("DFI") assessment, the user may define and assess the possible background conditions that could give rise to a specific anomaly. In an example, a single failure scenario exists (e.g., brine), with a prior probability equal to 1−COS. The procedure may be extended to the case with multiple failure scenarios.

After the identification of these conditions, the user may input the likelihood of the DFI for each scenario, as shown in Table 2:

TABLE 2

| Label | P (DFI\|case) |
|---|---|
| Oil & evaluated reservoir | 0.8 |
| Water & evaluated reservoir | 0.3 |

In this example case, a greater likelihood of the observed DFI for the success scenario (e.g., oil & evaluated reservoir) is estimated than for the failure scenario (e.g., water & evaluated reservoir). The posterior COS may then be calculated using the Bayes formula, as shown in Table 3:

TABLE 3

| Label | P (DFI\|case) | P (case, success) | P (case, failure) | P (case & DFI) | P (case\|DFI) |
|---|---|---|---|---|---|
| Oil & eval. res | 0.8 | 0.1 | | 0.080 | 0.229 |
| Water & eval. res | 0.3 | | 0.9 | 0.270 | 0.771 |

This means that, in this example case, the anomaly boosts the initial COS from 0.1 to 0.229.

The risk factors may be updated at the segment level. Embodiments of the methods disclosed herein may promote a fast and accurate update of the risk factors. As the term is used herein, "accurate" generally means the system may explicitly compute the updated probabilities of each risk factor given the seismic observation, e.g., without performing a Monte Carlo sampling. In order to obtain this result, a hierarchical chain may be followed.

FIG. 1 illustrates a hierarchical chain 100 with four risk groups 102, 104, 106, 108, according to an embodiment. Each risk group 102, 104, 106, 108 may include one or more risk factors. The risk factors may have the same relevance for concurring to the determination of the COS. The hierarchy may be functional for the algorithm presented herein. The probability of each risk group 102, 104, 106, 108 may be updated using the DFI information and the information from the risk groups that are above, except, for example, risk group 102, which has no risk groups above it in this instance. Accordingly, the reservoir quality may be updated, given the DFI and the reservoir presence. Within each risk group 102, 104, 106, 108, the proportions of the original assessment (pre-DFI) may be maintained.

Table 4 below may be illustrative, as it includes four examples of risk factors:

TABLE 4

| Risk factor | P (play) | P (segment\|play) |
|---|---|---|
| Trap and seal | 1.0 | 0.3 |
| Reservoir presence | 1.0 | 0.5 |
| Reservoir quality | 1.0 | 0.8 |
| Source and migration | 1.0 | 0.6 |

Figures 2, 5:
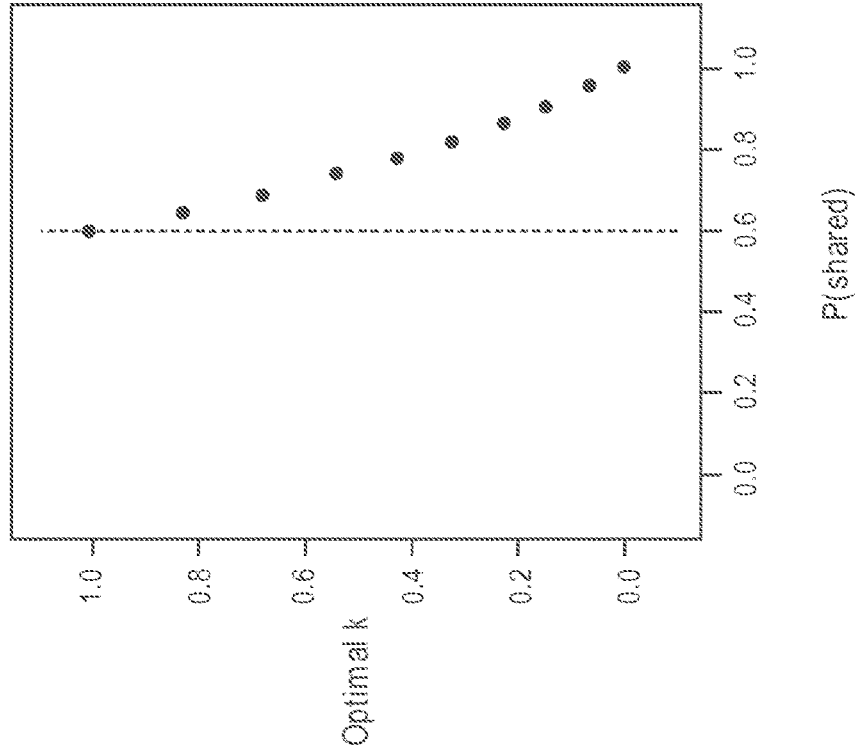
Figures 1, 5:
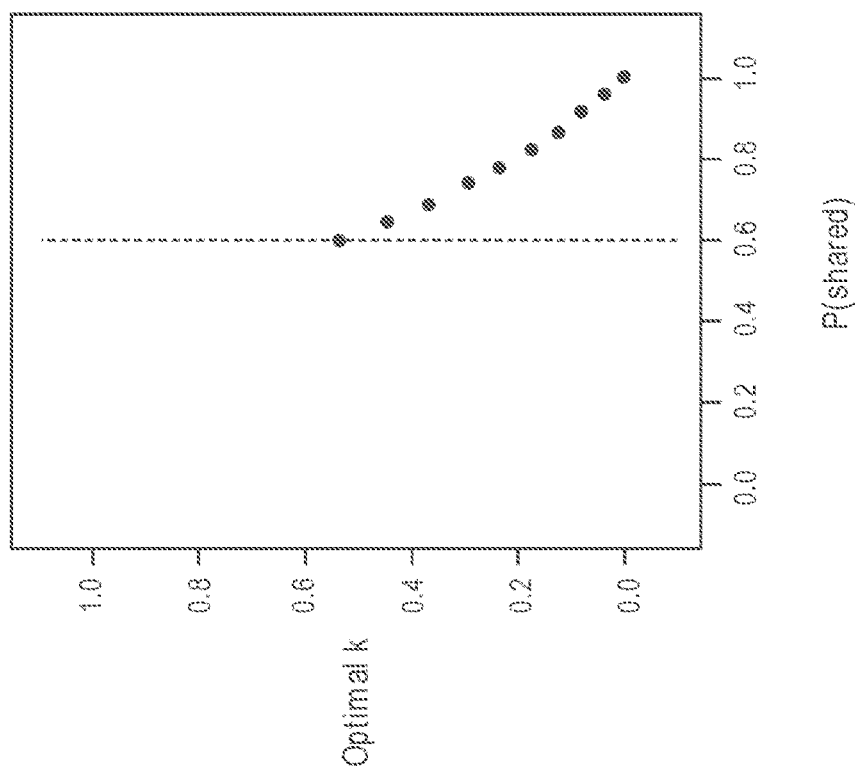

In this example, the factors "trap and seal" and "source and migration" belong to the hydrocarbon presence group. These values may be reported in the initial risk assessment tab of the GeoX program, as shown in FIG. 2, although any other suitable application or platform may be employed.

In an "initial fluids and reservoir probabilities display," which may be provided as a tab in a computer program, for example, as shown in FIG. 3, the different failure liquids and the different non-reservoir lithologies may be received as inputs into the system. In this example, the failure condition is water, and the non-reservoir condition is shale (labeled "Non reservoir 1").

Next, the system and/or method may assign the likelihoods to the success and failure scenarios. In Table 5, the success scenario is the scenario with greatest likelihood, followed by a success scenario with poor reservoir quality, a shale case, and a scenario with the reservoir filled with brine.

TABLE 5

| Label | P (DFI\|case) |
|---|---|
| Oil & evaluated reservoir | 0.8 |
| Oil & non evaluated reservoir | 0.6 |
| Water & evaluated reservoir | 0.3 |
| Water & non evaluated reservoir | 0.3 |
| Shale | 0.5 |

The "DFI assessment" display or tab may be used for assigning the likelihood values, as shown in FIG. 4. In FIG. 4, the word "Label" is used to distinguish a particular scenario, and therefore, it is used as a synonym for the word "Scenario" or "Case." As will be seen, the COS given DFI is updated in the right part of the table. In this case, the update reflects a belief (likelihood) and the prior information (original COS), following the Bayes formula. The COS is consequently boosted from 7.2% to 13.0%, because:

$$COS \mid DFI = \frac{COS * P(DFI \mid \text{success})}{P(DFI)} = \frac{0.072 * 0.8}{0.441} = 0.130$$

Finally, in the "DFI modified risk" tab, the updated probabilities for each risk factor may be found. The first quantity, P(RP|DFI), wherein "RP" refers to "reservoir presence" 102 (FIG. 1) may be calculated as follows:

$$P(RP \mid DFI) == P(RP, \text{Success} \mid DFI) + \sum_{i=1}^{4} P(RP, Failure_i \mid DFI) =$$

$$P(RP \mid \text{Sucess}, DFI) * P(\text{Success} \mid DFI) +$$

$$\sum_{i=1}^{4} P(RP \mid Fail_i, DFI) P(Fail_i \mid DFI) =$$

$$1 * 0.130 * 1 + 1 * 0.024 + 1 * 0.223 + 1 * 0.056 + 0 * 0.566 = 0.434$$

The remaining quantities may be computed in a similar way, taking into consideration the hierarchical structure of the chain, as shown in FIG. 1. Examples of the remaining quantities are shown in Table 6 below:

TABLE 6

| Risk factor | P (play) | P (segment\|play) |
|---|---|---|
| Trap and seal | 1.0 | 0.497 |
| Reservoir presence | 1.0 | 0.434 |
| Reservoir quality | 1.0 | 0.815 |
| Source and migration | 1.0 | 0.743 |
| >Marginal play probability | 1.0 | |
| >Conditional segment probability | | 0.130 |
| >Unconditional probability | | 0.130 |
| Dry hole risk | | 0.870 |

When two risk factors belong to the same risk group, their proportion may be maintained as in the original risk assessment. This is the case of the factors "trap & seal" and "source & migration." Originally, the log-proportion of "trap & seal" is:

$$\frac{\log(\text{Trap \& Seal})}{\log(\text{Trap \& Seal} * \text{Source \& Migration})} = \frac{\log(0.3)}{\log(0.3 * 0.6)} = 0.702$$

The log-proportion of "source & migration" is: 1−0.702=0.298.

Given the DFI and the first two risk groups of the present example, a joint updated probability for "trap and seal" and "source and migration" is equal to 36.92%. To compute the marginal updated probability of "trap & seal," therefore:

$P(\text{TS}|\text{DFI, RP, RQ})=0.3692^{0.702}=0.497$, and $P(\text{SM}|\text{DFI, RP, RQ})=0.3692^{0.298}=0.743$, where TS is "trap and seal," RP is "reservoir presence," RQ is "reservoir quality" and SM is "source and migration" as defined above.

In this situation, the probability of reservoir presence decreases from 0.5 to 0.43 due to a relatively high likelihood of the shale scenario with respect to the other failure scenarios. The boost in the COS is, therefore, a result more of hydrocarbon presence elements ("source and trap") than the reservoir presence, in this example, since a scenario with no reservoir has a relatively large likelihood.

The foregoing discloses an embodiment of a method for computing the updated risk factors estimates given a single DFI. The following discloses embodiments of a method for computing risk factor estimates in multiple segment prospects.

In this embodiment, the method may include determining the DFI in multi-segment prospects. Prospects that include multiple segments have a COS that is equal to or greater than the COS of the segment that has the highest COS. If the COS of the different segments are independent, then the COS of the prospect increases with the number of segments in the prospect. The prospect COS is the chance that at least one segment is successful, assuming that each of the segments is tested (e.g., drilled). Further, as described above, anomaly information such as a flat spot, conformance, etc. boosts the COS of a segment. Similarly, lack of anomaly information, when expected, attenuates the COS of the segment.

Turning now to how the anomalies' value may be estimated and assessed in multi-segment prospects, scenarios are considered in which the segments are independent. Scenarios are also considered where the segments are partially or completely risk dependent. Further, it will be seen that considering the anomalies as distinct pieces of information in both types of scenarios may be misleading.

Considering a prospect with two segments, located on either side of a fault, an anomaly may be recorded and interpreted for both segments. In seismic surveys, it may be difficult to determine whether the anomaly relates to the first or the second segment. In a similar situation, an implementation that considers the two anomalies as distinct pieces of information may lead to a large and unrealistic boost of the COS, since the presence of an anomaly generally increases the COS.

An embodiment of the present method, however, includes introducing DFI dependency groups, i.e., groups of segments that totally or partially share a DFI signal. The user may classify (e.g., enroll) segments as part of these groups and define the degree of correlation that the user believes is present in the anomalies. In other words, the user may introduce an explicit link between the DFI signals. This link may be controlled by a DFI correlation parameter "k" whose range of values is from 0 to 1.

A group with k=0 describes a situation where the anomalies recorded in the segments in the group are independent. A group with k=1 describes a situation where the DFI may be completely correlated (e.g., connected, linked, or associated), and, therefore, there is no additional information brought by the observation of several anomalies. A group with 0<k<1 (e.g., k=0.5) means that there is a partial correlation between the DFI signals.

It is possible to have situations where multiple segments are part of the same prospect, but the segments may be different from each other in terms of geological structure or geographical location. In those cases, situations may be modeled in which the DFI may be correlated just within a subgroup of segments.

The procedure presented here holds whether the segments are independent or risk-dependent. In this latter case, the risk elements associated with different segments within a prospect may be correlated through a shared geological control. The shared geological control may be used to model dependency among different segments. The presence and the probability of such control elements may be decided according to an understanding about the geology of the prospect. In general, a large probability of a geological control may correspond to a large degree of independence among the segments (since, as an example, the risk may lie on the independent branch of the tree), while a small probability corresponds to a highly risk-dependent situation (since in this example case, most of the risk lies in the shared geological control itself).

Figure 9:
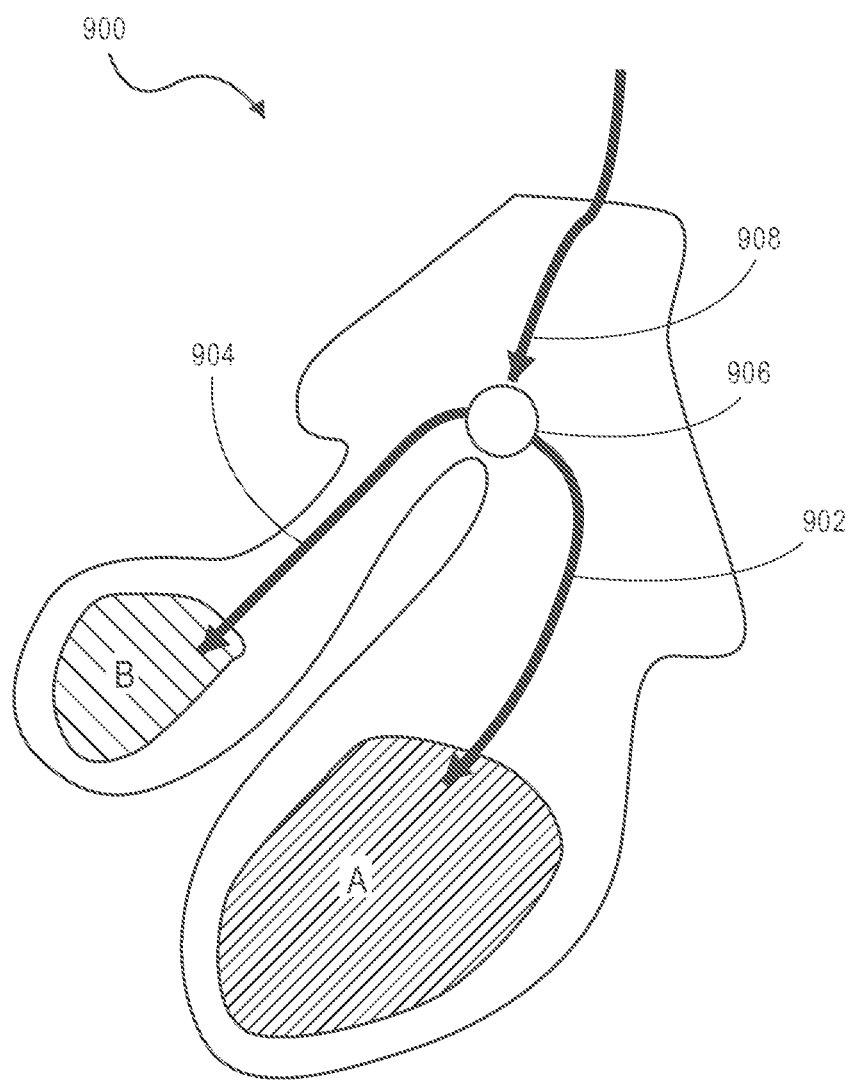
FIG. 9 illustrates a view of two illustrative segments A and B whose "Reservoir Presence" probability is estimated to be respectively 0.3 and 0.2, according to an embodiment.

FIG. 9 illustrates an example situation with two segments A and B whose "Reservoir Presence" probability is estimated to be respectively 0.3 and 0.2. We know that the two segments A, B likely represent two distinct branches 902, 904 of the same depositional system 900. However, complete dependency among the two branches 902, 904 may not be assumed; instead dependency up to a certain degree may be determined e.g., by the position of the dot 906 in FIG. 9. The dot 906 is in this example is the last point of common deposition, following the direction of the arrow 908, for the two segments A, B, and it may act as a shared geological control. In order to quantify the correlation, we may be able to assess the probability of such geological control, e.g., the probability that the deposition has reached the dot 906. Given that the deposition has reached the geological control, the branches 902, 904 may be totally independent, leading to the two segments A, B.

Embodiments of the present disclosure may provide an explicit way to model the correlation between seismic signals leading to the DFI. Using one or more embodiments of the present disclosure, this explicit connection may be introduced by assuming that the higher this correlation is in place within segments classified (e.g., enrolled) in the same DFI dependency group, the more the DFI signals will share the same kind of information. This is made possible through the definition of a "reference DFI" signal that will be described in greater detail below.

Turning to modeling the process through the introduction of the DFI correlation parameter "k," when the DFI correlation parameter k=0, a model of a scenario where the probability of observing an anomaly in a certain segment is consistent with the likelihood that the user has assigned to a given segment may be desired. In this case, it is assumed that the DFI signals are independent within the dependency group.

Assuming an example simple segment with a single failure scenario (water), and likelihood values for oil and brine equal 0.8 and 0.3, respectively, the following relationships are produced in Table 7:

TABLE 7

| Label (case) | P (DFI\|case) |
|---|---|
| Oil & evaluated reservoir | 0.8 |
| Water & evaluated reservoir | 0.3 |

This is equivalent to Table 8 below, where it is explicitly recognized that the independence of the DFI signal under consideration from the DFI reference segment, indicated with DFI_ref. The third column of this table shows the probability of DFI for this segment, given the scenario and the presence or absence of the DFI in the reference segment.

TABLE 8

| Label (case) | Label (DFI_ref) | P (DFI\|case, DFI_ref) |
|---|---|---|
| Oil & evaluated reservoir | Present | 0.8 |
| Water & evaluated reservoir | Present | 0.3 |
| Oil & evaluated reservoir | Absent | 0.8 |
| Water & evaluated reservoir | Absent | 0.3 |

Likewise, when k=1 (maximum correlation among the seismic signals within the DFI dependency group), the presence or absence of the signal in a given segment may be completely correlated with the presence or absence of the DFI reference signal. This dependency is reflected in Table 9 below:

TABLE 9

| Label (DFI_ref) | P (DFI\|DFI_ref) |
|---|---|
| Present | 1 |
| Absent | 0 |

Also in this case, the complete table may be displayed, as shown in Table 10 below:

TABLE 10

| Label (case) | Label (DFI_ref) | P (DFI\|case, DFI_ref) |
|---|---|---|
| Oil & evaluated reservoir | Present | 1 |
| Water & evaluated reservoir | Present | 1 |

TABLE 10-continued

| Label (case) | Label (DFI_ref) | P (DFI\|case, DFI_ref) |
|---|---|---|
| Oil & evaluated reservoir | Absent | 0 |
| Water & evaluated reservoir | Absent | 0 |

An example solution may include using the parameter k to build a linear interpolation between these two extreme scenarios. This linear interpolation may, however, not translate into a linear interpolation of the resulting COS, since the effect of this probability distribution is combined with a series of other probability distributions that define the dependency among risk factors.

The resulting Table 11 assigns the following weights to each scenario:

TABLE 11

| Label (case) | Label (DFI_ref) | P (DFI\|case, DFI_ref) |
|---|---|---|
| Oil & evaluated reservoir | Present | $0.8 + k * (1 - 0.8)$ |
| Water & evaluated reservoir | Present | $0.3 + k * (1 - 0.3)$ |
| Oil & evaluated reservoir | Absent | $0.8 - k * 0.8$ |
| Water & evaluated reservoir | Absent | $0.3 - k * 0.3$ |

Table 11 may be interpreted to mean that the higher the value of the DFI correlation parameter k, the more the DFI may resemble the reference DFI, ensuring the required correlation. Table 11 above, therefore, may represent the Conditional Probability Table ("CPT") that describes the probability distribution of the DFI signal, given the segment's COS and the DFI reference segment (DFI_ref). The method may be extended in case of multiple failure scenarios. The choice of the DFI reference segment may be automatic. In other words, the segment may have sampled uniformly among each of the segments that belong to the dependency group.

In some cases, a change of paradigm in the modeling of the DFI anomalies may be implemented. For example, embodiments of the present disclosure may sample the DFI signals using the likelihoods provided, e.g., by the user, and the CPTs generated, e.g., by the processor executing the software, and then produce an estimate of the COS by analyzing the number of success cases versus the total number of samples. This approach is consistent with a Monte Carlo architecture of the entire risking scheme.

The DFI correlation parameter k may have a range of admissible values, e.g., between 0 and 1, as noted above. The lower bound of this range is 0, i.e., the user may assume that its DFI signals are completely uncorrelated. The upper bound of the range may be computed by identifying the maximum correlation coefficient among the segments that belongs to the defined DFI dependency group. In some cases, this may not be calculated upper bound, but an upper bound dictated by a geological knowledge of the process.

For pairs of segments that belong to the considered DFI dependency group, the "Pearson correlation coefficient" may be determined. In the particular case of distributions with binary outcomes (oil/dry), the bivariate distribution of the COS for two segments X and Y, may be derived and this coefficient explicitly computed as shown in Table 12:

TABLE 12

| X/Y | Y = dry | Y = oil | marginal |
|---|---|---|---|
| X = dry | N00 | N01 | N0X |
| X = oil | N10 | N11 | N1X |
| Marginal | N0Y | N1Y | N |

In this table, N00 represents the number of Monte Carlo trials where both X and Y are unsuccessful, N01 represents the number of trials where Y alone is successful, N10 represents the number of cases where X alone is successful, N11 represents the number of cases where both X and Y are successful, N0X represents the number of cases where X is dry and N are the total MC runs. The correlation coefficient ρ may be then computed as:

$$\rho XY = \frac{N11 * N00 - N10 * N01}{\sqrt{(N0X * N1X * N0Y * N1Y)}}$$

Once the Pearson coefficients are determined, the maximum of the range may be set as a maximum admissible value of the range and the average as suggested value for the parameter "k". Without external information, the DFI correlation may reflect the geological risk correlation present among the segments. The choice presented here is one illustrate way to set the DFI correlation parameter, and it is not to be intended as the sole possible choice.

An insight into a relationship between risk dependency and the DFI correlation coefficient k may be seen using the two graphs shown in FIGS. 5-1 and 5-2. As shown, ρXY vs. P(shared) is plotted for a prospect with two segments A and B, and a single risk factor. There is an inverse proportionality relationship between these two quantities. Further, as shown in this example, when the two COS are equal, the largest value for the DFI correlation parameter "k" is 1, while when the two COS are different, the largest value for "k" is lower than 1 because of the asymmetric behavior of the prospect COS.

EXAMPLES

The present systems and methods may be further understood with reference to the following one or more non-limiting examples.

An illustrative example may be represented by an example prospect. This example prospect has a 4-way closure and a 3-way fault-dependent closure. The two closures are separated by a saddle at 1060 m. A spill point for the combined structure is 1080 m.

In this example, an anomaly may be observed both on the 4-way closure and on the 3-way closure. The 4-way closure has been assessed as two different segments, because of a fault that divides the structure. The 4-way closure has a high chance for a successful trap (80%). There is a slight chance that the seal could be breached by a thief zone or sub-seismic faulting. The 3-way closure is riskier and has a 30% chance for an adequate fault seal. There is no trap risk dependency between the two closures. The targets are in the same sand, which has a 35% chance of being present. The targets, therefore, share a reservoir risk dependency. The targets share the same chance of "source and migration." Estimates of the shared play and conditional segment probabilities for the two segments that compose the 4-way closure are shown in Table 13 below:

TABLE 13

| Risk factor | P (play) | P (segment|play) | Overall risk |
|---|---|---|---|
| Trap & seal [%] | 100 | 80 | 80 |
| Reservoir Presence [%] | 70 | 50 | 35 |
| Reservoir Quality [%] | 100 | 100 | 100 |
| Source and Migration [%] | 80 | 80 | 64 |
| | COS (Unconditional probability) | | 17.9 |

The equivalent estimates for the 3-way closure are shown in Table 14:

TABLE 14

| Risk factor | P (play) | P (segment|play) | Overall risk |
|---|---|---|---|
| Trap & seal [%] | 100 | 80 | 50 |
| Reservoir Presence [%] | 70 | 50 | 35 |
| Reservoir Quality [%] | 100 | 100 | 100 |
| Source and Migration [%] | 80 | 80 | 64 |
| | COS (Unconditional probability) | | 11.2 |

These example segments are in the same play and have the same shared play risks. They also have the same conditional reservoir presence and source and migration risks. The sole difference is the higher risk on "trap and seal" for the 3-way closure. As shown, the initial COS of the two segments composing the 4-way structure is 17.9%, while the initial COS for the 3-way is 11.2%.

Considering water as the failure fluid condition and shale as the non-reservoir condition, two possible failure scenarios and one possible success scenario are present. The probability of shale is 1−P(res)=0.65 for the three segments. The probability of water and reservoir is P(Water & Res)=(1−P(T&S)*P(S&M))*P(Res) and is respectively equal to:

(1−0.8*0.64)*0.35=0.171 for the two segments composing the 4-way closure, and (1−0.5*0.64)*0.35=0.238 for the 3-way closure segment.

The likelihoods estimated by the geologists are consistent with the observation: the strongest anomaly is observed in correspondence of the 4-way closure, and a weaker anomaly in correspondence of the 3-way structure. The following likelihoods may thus be assessed:

P(DFI|Oil & eval. res.)=0.8 (0.6 for the 3-way)

P(DFI|Water & eval. res.)=0.3 (0.3 for the 3-way)

P(DFI|Water & not. eval. res.)=0.2 (0.4 for the 3-way)

As a result, an updated COS for the 4-way and for the 3-way closure may be determined as follows:

$$4 \text{ way: } P(\text{Oil \& eval. Res} | DFI) = P(DFI | \text{Oil \& eval. res}) *$$
$$P(\text{Oil \& eval. res.}) / P(DFI)$$
$$= 0.8 * 0.179 / 0.325$$
$$= 0.442$$

$$3 \text{ way: } P(\text{Oil \& eval. Res} | DFI) = P(DFI | \text{Oil \& eval. res}) *$$
$$P(\text{Oil \& eval. res.}) / P(DFI)$$
$$= 0.6 * 0.112 / 0.399$$
$$= 0.169$$

The analyses of the three segments may be included as part of (e.g., enrolled in) the prospect analysis of this example prospect. There is full risk dependency among the three segments in terms of "reservoir presence" as well as "source and migration." The "trap and seal" risk factor is assessed as partially dependent (P(shared)=0.9) for the two segments belonging to the 4-way structure.

The prior prospect COS is 20.87% (this comes from 0.64*0.35*1*(0.864+0.5−0.864*0.5), where 0.864 is the probability that the 4-way trap works, and it is computed as 0.9*(1−0.2*0.2)). The prospect COS with DFI is 78.24% if we regard the DFI signals in the two segments that compose the 4-way structure as independent. This may not be a good representation of the scenario, and therefore these two segments may be classified as part of (e.g., enrolled in) a DFI dependency group.

The first computation may be used to determine the correlation coefficient between the 4-way A and the 4-way B segments. For this case study the correlation matrix (produced with a Monte Carlo sampling of the COS of the two segments without DFI) may be seen in Table 15 below:

TABLE 15

| 4-wayA/4 wayB | Success | Failure 1 (brine) | Failure 2 (shale) | Marginal |
|---|---|---|---|---|
| Success | 0.159 | 0.020 | 0 | 0.179 |
| Failure 1 (brine) | 0.020 | 0.151 | 0 | 0.171 |
| Failure 2 (shale) | 0 | 0 | 0.65 | 0.65 |
| Marginal | 0.179 | 0.171 | 0.65 | 1 |

The matrix is symmetrical in this particular case, since the two segments are assessed in an identical manner, in terms of risk dependency. Since the correlation of the COS is at issue, the failure scenarios may be grouped, allowing the following compact version of the correlation matrix to be derived as shown in Table 16:

TABLE 16

| 3-way/4 way | Success | Failure | Marginal |
|---|---|---|---|
| Success | 0.159 | 0.020 | 0.179 |
| Failure | 0.020 | 0.801 | 0.821 |
| Marginal | 0.179 | 0.821 | 1 |

Note that the marginals match the original COS shown previously. Now, to compute the correlation coefficient, the following may be used:

$$\rho XY = \frac{0.159*0.801 - 0.020*0.020}{\sqrt{(0.179*0.821*0.179*0.821)}} = 0.865$$

This is a coefficient that resumes the degree of correlation that exists between the two segments classified (e.g., enrolled) in the DFI dependency group. This will be the maximum value allowed for the correlation of the DFI signal. Since the segments have a geological risk correlation of 0.865, it might not be possible that the DFI have a higher degree of correlation. This might prevent the user from introducing artificially high correlations in the anomalies that do not reflect the geology of the prospect. Since in this DFI dependency group there are just two segments, this value is also the suggested value for the DFI dependency factor.

With this value for the factor "k", the CPT may be modified as prescribed. In Monte Carlo samples, the reference node among 4-way A and 4-way B may be sampled, and the modified CPT used to introduce correlation in the DFI signals.

With this new analysis, the updated prospect COS becomes 53.72%. The boost is attenuated by the fact that an 86% correlation between the anomalies of the 4-way closure is introduced. Without this correlation in place, an updated COS of 78.24% is calculated, as shown previously. This concludes the example. In the next three paragraphs we will discuss some implementation details related to this example.

Within the defined dependency group, made by segments 4-way A and 4-way B, the reference node may be sampled. In this case, the two segments are identical, and so it does not matter which of the two is chosen. Assuming that 4-way A is chosen as the reference, the DFI likelihoods of the segment 4-way A follow the CPT shown in Table 17:

TABLE 17

| Label (case) | P(DFI\|case) |
|---|---|
| Oil & eval. Res. | 0.8 |
| Brine & eval. Res | 0.3 |
| Non eval. Res. | 0.2 |

The likelihoods of the DFI in 4-way segment B given the corresponding segment and the reference DFI (4-way A) follow the CPT shown in Table 18:

TABLE 18

| Label (case) | Label (DFI_ref) | P(DFI\|case, DFI_ref) |
|---|---|---|
| Oil & eval. Res. | Present | 0.973 |
| Brine & eval. Res | Present | 0.905 |
| Non eval. Res. | Present | 0.892 |
| Oil & eval. Res. | Absent | 0.108 |
| Brine & eval. Res | Absent | 0.041 |
| Non eval. Res. | Absent | 0.027 |

These values may be derived using a value of the DFI correlation coefficient equal to 0.865. The consequences of such CPT are that if the reference DFI has been sampled as present, the 4-way B DFI may be sampled using the likelihoods of the first three rows, while if the reference DFI has been sampled as absent, the likelihoods of the last three rows may be used. This procedure enables the desired correlation to be met.

In order to compute the COS of the dependency group, the following quantities out of a series of Monte Carlo trials may be computed: (1) the number of samples whose DFI variable is sampled as present both in the 4-ways A and in the 4-ways B segments, and (2) the number of samples that have at least one segment successful, out of the samples selected before. The group COS is the quotient between (2) and (1), i.e., P(4-ways A V 4-ways B|DFI 4-ways A and 4-ways B). These quantities are listed respectively as 724, 726, and 728 in FIG. 7. Further, the group COS is used to build the prospect COS, together with the 3-ways segment.

Figure 6:
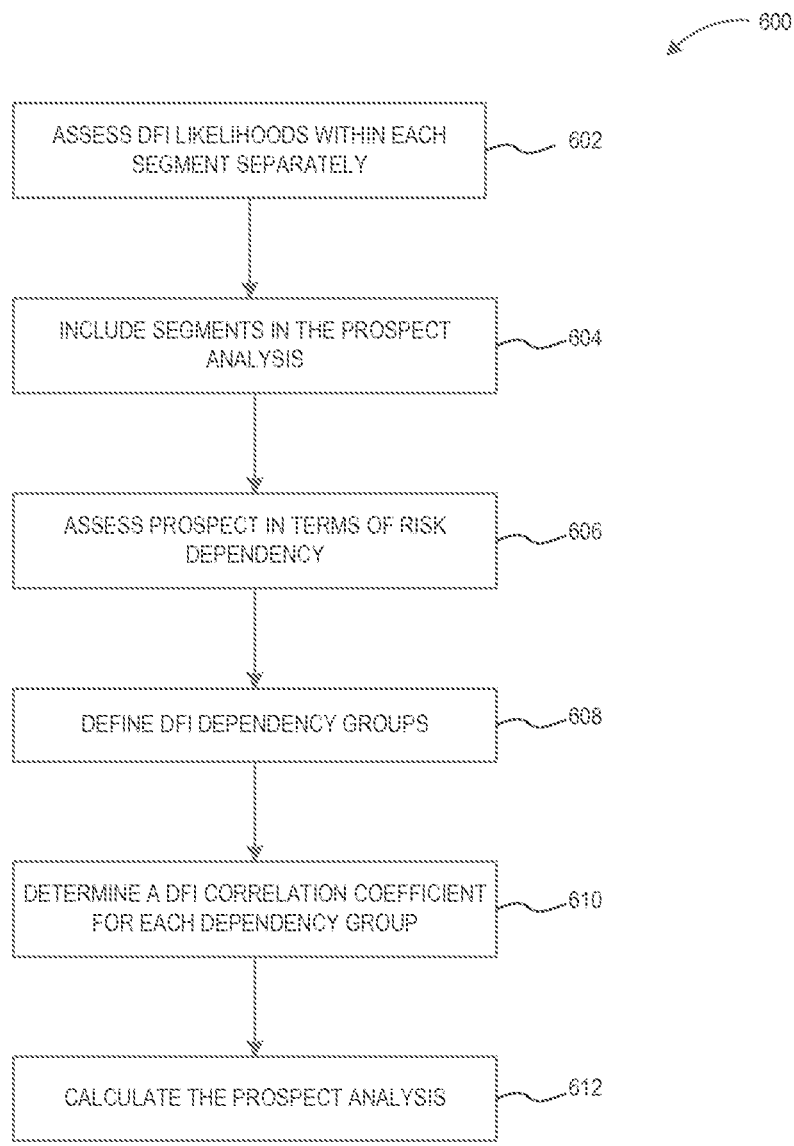
FIG. 6 illustrates a flowchart of a method for assessing a prospect analysis in the presence of multiple DFI anomalies, according to an embodiment.

FIG. 6 illustrates a flowchart of a method 600 for assessing a prospect analysis in the presence of multiple DFI anomalies, according to an embodiment. The DFI likelihoods within each segment may be assessed separately, as at 602. The segments may be included in the prospect analysis, as at 604, e.g., by enrolling, inputting, or otherwise classifying the segments as part of the prospect analysis. The prospect may be assessed in terms of risk dependency, as at

606. The DFI dependency groups (if present) may be defined, as at 608. The DFI correlation coefficient may be determined for one or more (e.g., each) dependency group, as at 610. For example, the DFI correlation coefficient may be received as input from an external source, such as user input. In other cases, without external input, a value consistent with the risk dependency may be used. The prospect analysis may then be calculated, as at 612.

In the example, the existing geological correlation may be used to determine the parameter k. Further, geologists, geophysicists, and/or others who work in the area may provide a better evaluation of the parameter k that drives the correlation, and provide more realistic estimates of the prospect COS. The consistency in the volumetric estimates may be preserved by the uniform sampling of the reference node.

The method 600 may be particularly useful when dealing with prospects that include a large number of risk-dependent segments. In such cases, the existing estimation of the prospect COS may reflect an assumption of independence among the anomalies. The result may be an unrealistic boost in the COS. To avoid such an unrealistic boost, anomalies may be considered to be correlated. A simple case with three identical, fully-dependent segments with individual COS equal to 20% (and therefore with prospect COS equal to 20% as well if the anomalies are ignored) may be considered as illustrative. The analysis with independent anomaly indicators gives a prospect COS of 87%, while the analysis using an embodiment of the method 600 may return a prospect COS of 43%, according to one specific example.

Embodiments of the method 600 disclosed herein extend the application of the BRM to the use of anomalies in multiple segment prospects. This may exploit the benefits of Bayesian analysis. It may make the computations transparent and reproducible for both interpretation and use by the exploration team.

In some cases, it may be possible to compute the updated prospect COS analytically (i.e., without Monte Carlo sampling). In a case with two segments and a single failure scenario, the data may be the following:

$COS(A)=0.3$, $COS(B)=0.2$, $P(\text{shared})=0.3$ (max correlation)

The DFI likelihoods are as shown in Table 19:

TABLE 19

| Label (case A) | P(DFI A\|case A) |
|---|---|
| Success | 0.7 |
| Failure | 0.1 |

| Label (case B) | P(DFI B\|case B) |
|---|---|
| Success | 0.6 |
| Failure | 0.5 |

The correlation coefficient is equal to 0.7638. This number may be used as factor k in the computations. The computations may be shown using segment B as the reference node. The same computations may be obtained in a symmetrical way using A as the reference node. The prospect COS is obtained by a simple average of the two final quantities.

The likelihood table for DFI_B and DFI_A are as shown in Tables 20 and 21:

TABLE 20

| Label (case B) | P(DFI B\|case B) |
|---|---|
| Success | 0.6 |
| Failure | 0.5 |

TABLE 21

| Label (case A) | Label (DFI B) | P(DFI A\|case A, DFI B) |
|---|---|---|
| Success | Present | 0.929 |
| Failure | Present | 0.787 |
| Success | Absent | 0.165 |
| Failure | Absent | 0.024 |

In order to compute the prospect COS, a 1−P(failure_A, failure_B|DFI_A, DFI_B) is calculated. The number computed with GeoX is 0.364. This means that P(failure_A, failure_B|DFI_A, DFI_B) is equal to 0.636.

The quantity may also be analytically derived, first, using the Bayes theorem: P(failure_A, failure_B|DFI_A, DFI_B)= P(failure_B|failure_A, DFI_A, DFI_B)*P(failure_A|DFI_A, DFI_B). Accordingly, it is seen that P(failure_B|failure_A, DFI_A, DFI_B)=1, since if segment A fails, then the shared node fails as well, and segment B fails as a direct consequence. Therefore, the analysis is left with the computation of P(failure_A|DFI_A, DFI_B). Again using the Bayes theorem, the following results:

$$P(\text{failure\_A}|\text{DFI\_A}, \text{DFI\_B}) = \frac{P(failure_A, DFI_A | DFI_B)}{P(DFI_A | DFI_B)}$$

$$= \frac{P(DFI_A | failure_A, DFI_B) * P(failure_A | DFI_B)}{P(DFI_A | DFI_B)}$$

The first factor of the numerator may be read directly from the likelihood table, and it is equal to 0.787. The second factor of the numerator needs to be worked out with the law of total probability:

$P(\text{failure}\_A|\text{DFI}\_B)=P(\text{failure}\_A, \text{success}\_B|\text{DFI}\_B)+P(\text{failure}\_A, \text{failure}\_B|\text{DFI}\_B)$.

The first addend is 0, since segment B cannot be a success while segment A is a failure, given the max dependency between the two segments. The second addend is:

$P(\text{failure}\_A, \text{failure}\_B|\text{DFI}\_B)=P(\text{failure}\_A|\text{failure}\_B, \text{DFI}\_B)*P(\text{failure}\_B|\text{DFI}\_B)$ The first factor is P(failure_A|failure_B), and this may be computed by considering that if B fails there is 7/8 of probability that the shared node fails as well, since P(failure_shared|failure_B)=(1*7/10)/(8/10)=7/8=0.875. The second factor may be computed with the same at segment level, and it may be:

$P(\text{DFI}\_B|\text{failure}\_B)*P(\text{failure}\_B)/P(\text{DFI}\_B)=0.5*0.8/0.52=0.769$.

Therefore:

$P(\text{failure}\_A|\text{DFI}\_B)=0.875*0.769=0.673$.

Finally, the denominator P (DFI_A|DFI_B) is computed by summing out the upper part of the likelihood table for DFI_A, and it is therefore equal to 0.929*0.3+ 0.787*0.7=0.830.

As such, the following may be determined:

$$P(\text{failure\_A, failure\_B} | \text{DFI\_A, DFI\_B}) =$$

$$P(\text{failure\_A} | \text{DFI\_A, DFI\_B}) = \frac{0.787 * 0.673}{0.830} = 0.64.$$

This means that when B is used as reference node the prospect COS is equal to 0.36, as shown in the beginning of the example. In a symmetrical way, the prospect COS may be achieved when A is used as reference node is 0.753. Finally, the modified prospect COS may be computed as (0.364+0.753)/2=0.559, with a substantial boost from the original prospect COS equal to 0.3.

The following illustrates a Monte Carlo algorithm having N segments (s1, . . . , sN) and Q risk factors with probabilities r1, . . . , rQ. To begin, the risk factors r1, . . . , rQ may be assigned for each segment. At the segment level, the risk factors may be sampled according to r1, . . . , rQ. The prior COS may then be derived. The prior probabilities for each failure scenario may be computed. The likelihoods for each success and failure scenario may be assigned. The posterior COS|DFI may be computed using the prior probabilities and the segment likelihoods.

Figure 7:
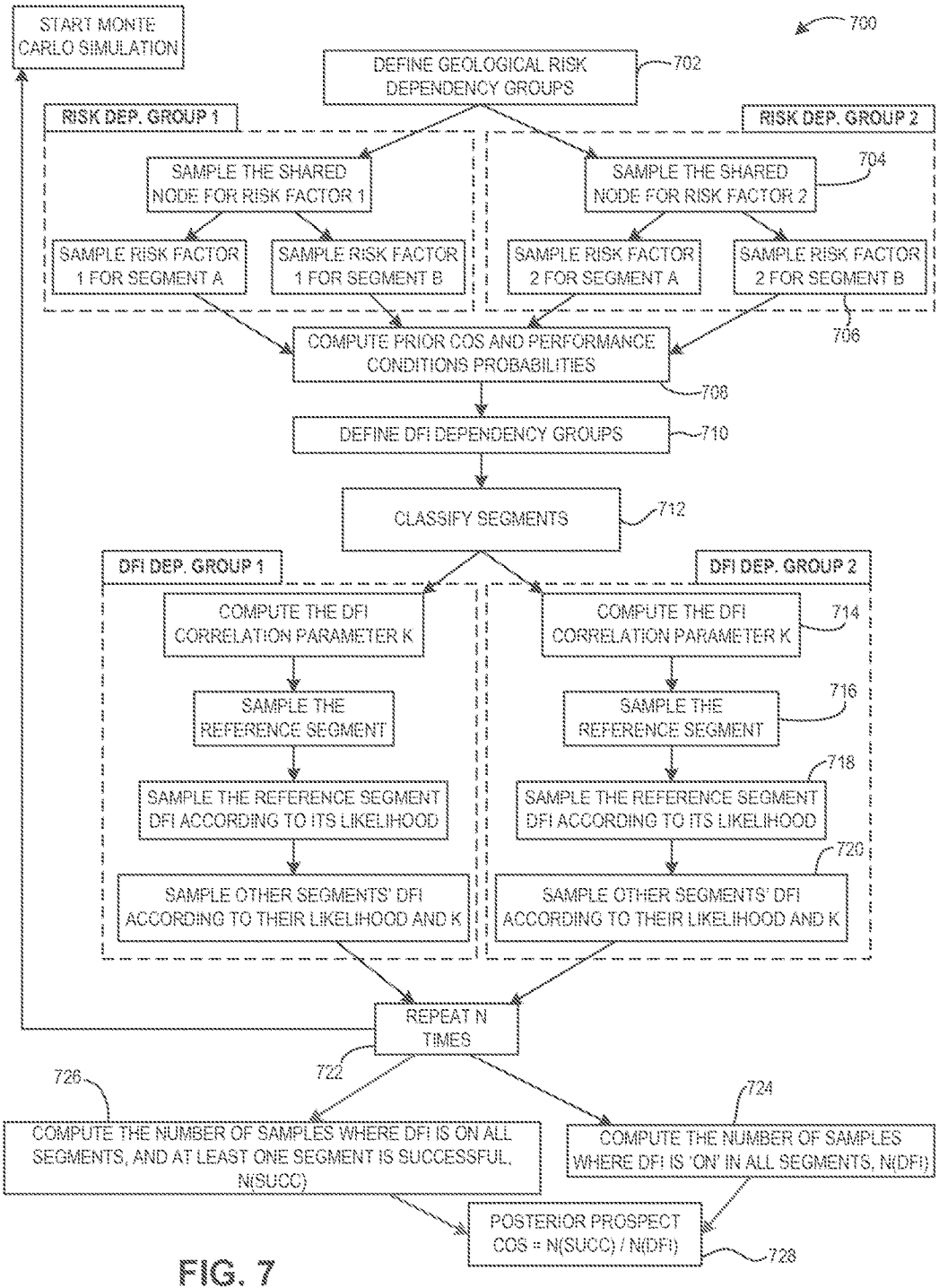
FIG. 7 illustrates a flowchart of a method for determining a posterior prospect COS, according to an embodiment. The term PFRM means Pore Fluid and Rock Matrix Conditions, and it refers to the possible failure conditions (scenarios).

FIG. 7 illustrates a flowchart of a method 700 for determining a posterior prospect COS, according to an embodiment. At the prospect level, the geological risk dependency groups may be defined, as shown at 702. The shared nodes for the risk factors may be sampled, as shown at 704. For segment=s1:sN, r1, . . . , rQ may be sampled according to the shared nodes, as shown at 706. The prior COS may then be derived. The prior probabilities may be computed for each failure scenario. The likelihoods for each success and failure scenario may be assigned. The posterior COS|DFI may then be computed using the prior probabilities and the segment likelihoods, as shown at 708. The DFI dependency groups may be defined, as shown at 710. The segments may be classified as part of (e.g., enrolled in) the DFI dependency groups, as shown at 712.

The DFI correlation parameter k may be computed using the Pearson correlation parameter for COS, as shown at 714. For each dependency group, the reference segment may be sampled, as shown at 716. The DFI signal for the reference segment may be sampled using its likelihoods, as shown at 718. For segment=1:(Nd-1), (all but the reference within the dependency group) the DFI signals may be sampled according to their likelihoods and to the sampled DFI signal, weighted with the DFI correlation parameter k, as shown at 720. This process may be repeated N times, as shown at 722. The number of samples whose DFI variable is present in one, some, or each of the segments may be computed, as shown at 724. The DFI variable present may indicate that the DFI is sampled according to the success case. The average volume of these samples gives the "unconditional prospect volume." The number of samples that have at least one segment successful, out of the samples selected, may be computed, as shown at 726. The average volume of these samples gives the "risked prospect volume." The quotient between the number of samples in 726 and 724 may give the posterior prospect COS, as shown at 728.

Figure 8:
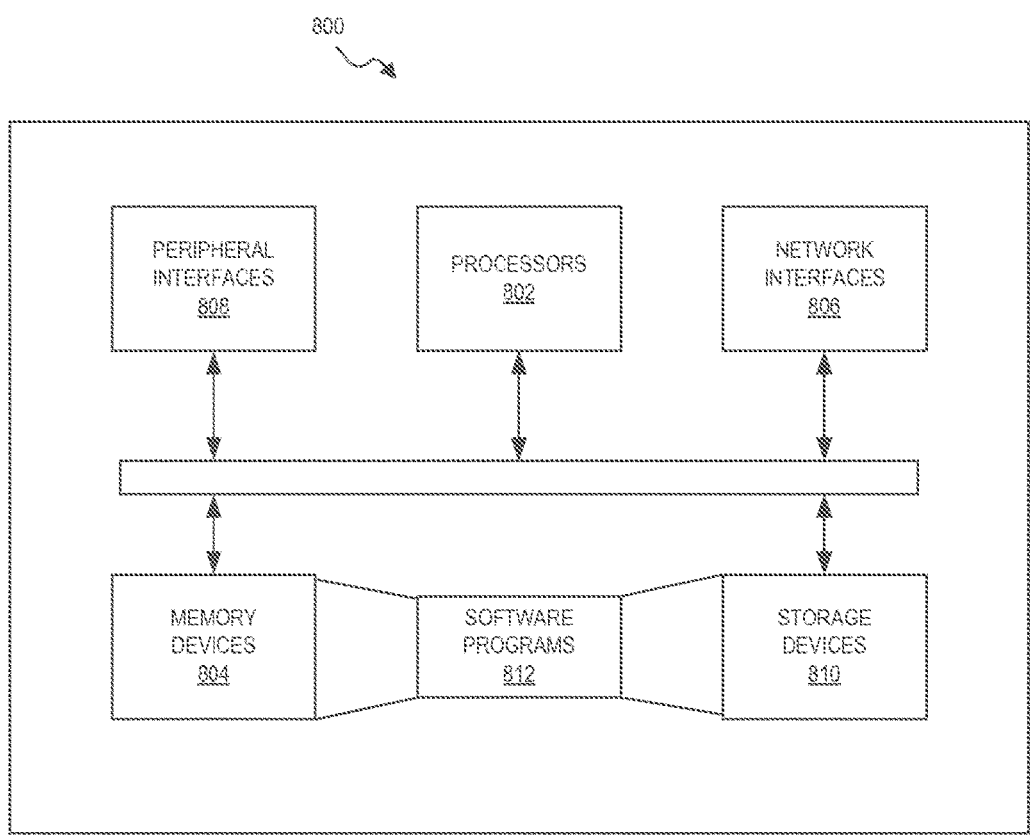
FIG. 8 illustrates a schematic view of a computing system, according to an embodiment.

Embodiments of the disclosure may also include one or more systems for implementing one or more embodiments of the method of the present disclosure. FIG. 8 illustrates a schematic view of such a computing or processor system 800, according to an embodiment. The processor system 800 may include one or more processors 802 of varying core (including multi-core) configurations and clock frequencies. The one or more processors 802 may be operable to execute instructions, apply logic, etc. It may be appreciated that these functions may be provided by multiple processors or multiple cores on a single chip operating in parallel and/or communicably linked together.

The processor system 800 may also include a memory system, which may be or include one or more memory devices and/or computer-readable media 804 of varying physical dimensions, accessibility, storage capacities, etc. such as flash drives, hard drives, disks, random access memory, etc., for storing data, such as images, files, and program instructions for execution by the processor 802. In an embodiment, the computer-readable media 804 may store instructions that, when executed by the processor 802, are configured to cause the processor system 800 to perform operations. For example, execution of such instructions may cause the processor system 800 to implement one or more portions and/or embodiments of the method described above.

The processor system 800 may also include one or more network interfaces 806. The network interfaces 806 may include any hardware, applications, and/or other software. Accordingly, the network interfaces 806 may include Ethernet adapters, wireless transceivers, PCI interfaces, and/or serial network components, for communicating over wired or wireless media using protocols, such as Ethernet, wireless Ethernet, etc.

The processor system 800 may further include one or more peripheral interfaces 808, for communication with a display screen, projector, keyboards, mice, touchpads, sensors, other types of input and/or output peripherals, and/or the like. In some implementations, the components of processor system 800 need not be enclosed within a single enclosure or even located in close proximity to one another, but in other implementations, the components and/or others may be provided in a single enclosure.

The memory device 804 may be physically or logically arranged or configured to store data on one or more storage devices 810. The storage device 810 may include one or more file systems or databases in any suitable format. The storage device 810 may also include one or more software programs 812, which may contain interpretable or executable instructions for performing one or more of the disclosed processes. When requested by the processor 802, one or more of the software programs 812, or a portion thereof, may be loaded from the storage devices 810 to the memory devices 804 for execution by the processor 802.

Those skilled in the art will appreciate that the above-described componentry is merely one example of a hardware configuration, as the processor system 800 may include any type of hardware components, including any accompanying firmware or software, for performing the disclosed implementations. The processor system 800 may also be implemented in part or in whole by electronic circuit components or processors, such as application-specific integrated circuits (ASICs) or field-programmable gate arrays (FPGAs).

The foregoing description of the present disclosure, along with its associated embodiments and examples, has been presented for purposes of illustration only. It is not exhaustive and does not limit the present disclosure to the precise form disclosed. Those skilled in the art will appreciate from the foregoing description that modifications and variations are possible in light of the above teachings or may be acquired from practicing the disclosed embodiments.

For example, the same techniques described herein with reference to the processor system 800 may be used to execute programs according to instructions received from another program or from another processor system altogether. Similarly, commands may be received, executed, and their output returned entirely within the processing and/or memory of the processor system 800.

Likewise, the steps described need not be performed in the same sequence discussed or with the same degree of separation. Various steps may be omitted, repeated, combined, or divided, as necessary to achieve the same or similar objectives or enhancements. Accordingly, the present disclosure is not limited to the above-described embodiments, but instead is defined by the appended claims in light of their full scope of equivalents. Further, in the above description and in the below claims, unless specified otherwise, the term "execute" and its variants are to be interpreted as pertaining to any operation of program code or instructions on a device, whether compiled, interpreted, or run using other techniques.

What is claimed is:

1. A method for determining a chance of success for a prospect in a subterranean formation, comprising:
   receiving seismic data that is produced in response to a seismic survey of the prospect, wherein the seismic data is indicative of a plurality of anomalies in the prospect, wherein the prospect includes a plurality of segments;
   computing prior probabilities of success and failure scenarios for at least one of the segments;
   determining likelihoods of the anomalies given the success and failure scenarios for the at least one of the segments;
   classifying at least two of the segments as part of a direct fluid indicator dependency group;
   determining a degree of correlation between the anomalies for the direct fluid indicator dependency group;
   determining a posterior chance of success for the prospect based at least in part on the degree of correlation between the anomalies; and
   updating a model of the subterranean formation based at least in part on the posterior chance of success for the prospect, wherein the model is configured to be used to determine a presence of hydrocarbons in one or more of the segments in the prospect in the subterranean formation.

2. The method of claim 1, further comprising:
   sampling a first of the anomalies for the direct fluid indicator dependency group using one or more of the prior probabilities of success and failure scenarios for a first of the segments; and
   sampling one or more remaining anomalies using one or more of the prior probabilities of success and failure scenarios for a second of the segments and using the degree of correlation within the direct fluid indicator dependency group.

3. The method of claim 2, further comprising:
   determining a first number of samples where all of the anomalies are present; and
   determining a second number of samples that have a success scenario in at least one of the segments, wherein the second number of samples is selected from the first number of samples.

4. The method of claim 3, wherein the posterior chance of success is determined at least partially by a quotient between the second number of samples and the first number of samples.

5. The method of claim 1, further comprising defining geological risk dependencies existing among the segments.

6. The method of claim 1, wherein the segments of the direct fluid indicator dependency group at least partially share least at one of the anomalies.

7. The method of claim 1, wherein the seismic anomalies are separate anomalies when the degree of correlation is 0.

8. The method of claim 1, wherein the seismic anomalies are the same anomaly when the degree of correlation is 1.

9. The method of claim 1, wherein the seismic anomalies are partially correlated when the degree of correlation is between 0 and 1.

10. The method of any of claims 2-9, wherein determining a posterior chance of success for the prospect based at least in part on the degree of correlation between the anomalies further comprises determining a posterior chance of success for the prospect based at least in part on the degree of correlation between the anomalies computed or entered previously.

11. The method of claim 1, wherein determining a posterior chance of success for the prospect based at least in part on the degree of correlation between the anomalies further comprises determining a posterior chance of success for the prospect based at least in part on the degree of correlation between the anomalies computed or entered previously.

12. The method of any of claims 5-11, further comprising:
    sampling a first of the anomalies for the direct fluid indicator dependency group using one or more of the prior probabilities of success and failure scenarios for a first of the segments; and
    sampling remaining anomalies using one or more of the prior probabilities of success and failure scenarios for a second of the segments and using the degree of correlation within the direct fluid indicator dependency group.

13. The method of any of claims 5-11, further comprising:
    determining a first number of samples where all of the anomalies are present; and
    determining a second number of samples that have a success scenario in at least one of the segments, wherein the second number of samples is selected from the first number of samples.

14. The method of claim 13, wherein the posterior chance of success is determined at least partially by a quotient between the second number of samples and the first number of samples.

15. The method of any of claims 2-4 and 6-11, further comprising defining geological risk dependencies existing among the segments.

16. The method of any of claims 2-5 and 7-11, wherein the segments of the direct fluid indicator dependency group at least partially share least at one of the anomalies.

17. The method of any of claims 2-6 and 8-11, wherein the seismic anomalies are separate anomalies when the degree of correlation is 0.

18. The method of any of claims 2-7, 9, and 11, wherein the seismic anomalies are the same anomaly when the degree of correlation is 1.

19. The method of any of claims 2-8 and 11, wherein the seismic anomalies are partially correlated when the degree of correlation is between 0 and 1.

20. The method of claim 1, wherein the seismic survey comprises:
    transmitting a seismic signal into the prospect; and
    receiving a reflected seismic signal comprising the seismic data.

21. The method of claim 1, wherein the model is updated to display the posterior chance of success that at least one segment in the prospect in the subterranean formation has hydrocarbons.

22. A computing system, comprising:
a display;
a processor; and
a memory system comprising one or more non-transitory computer readable media storing instructions thereon that, when executed by the processor, are configured to cause the computing system to perform operations, the operations comprising:
receiving seismic data that is produced in response to a seismic survey of a prospect in a subterranean formation, wherein the seismic data is indicative of a plurality of anomalies in the prospect, and wherein the prospect includes a plurality of segments;
computing prior probabilities of success and failure scenarios for at least one of the segments;
determining likelihoods of the anomalies given the success and failure scenarios for the at least one of the segments;
classifying at least two of the segments as part of a direct fluid indicator dependency group;
determining a degree of correlation between the at least two anomalies for the direct fluid indicator dependency group;
determining a posterior chance of success for the prospect based at least in part on the degree of correlation between the anomalies; and
updating a model of the subterranean formation based at least in part on the posterior chance of success for the prospect, wherein the model is configured to be used to determine a presence of hydrocarbons in one or more of the segments in the prospect in the subterranean formation.

23. The computing system of claim 22, wherein the operations further comprise:
sampling a first of the seismic anomalies for the direct fluid indicator dependency group using one or more of prior probabilities of success and failure scenarios for a first of the segments; and
sampling remaining seismic anomalies using one or more of prior probabilities of success and failure scenarios for a second of the segments and using the degree of correlation within the direct fluid indicator dependency group.

24. The computing system of claim 23, wherein the operations further comprise:
determining a first number of samples where all of the anomalies are present; and
determining a second number of samples that have a success scenario in at least one of the segments, wherein the second number of samples is selected from the first number of samples.

25. The computing system of claim 24, wherein the posterior chance of success is determined at least partially by a quotient between the second number of samples and the first number of samples.

26. The computing system of any of claims 23-25, wherein the operations further comprise defining geological risk dependencies existing among the segments.

27. The computing system of claim 22, wherein the operations further comprise defining geological risk dependencies existing among the segments.

28. The computing system of claim 27, wherein the operations further comprise:
sampling a first of the anomalies for the direct fluid indicator dependency group using one or more of the prior probabilities of success and failure scenarios for a first of the segments; and
sampling remaining anomalies using one or more of the prior probabilities of success and failure scenarios for a second of the segments and using the degree of correlation within the direct fluid indicator dependency group.

29. The computing system of claim 27, wherein the operations further comprise:
determining a first number of samples where all of the anomalies are present; and
determining a second number of samples that have a success scenario in at least one of the segments, wherein the second number of samples is selected from the first number of samples.

30. The computing system of claim 29, wherein the posterior chance of success is determined at least partially by a quotient between the second number of samples and the first number of samples.

31. A non-transitory computer-readable medium storing instructions thereon that, when executed by a processor, are configured to cause the processor to perform operations, the operations comprising:
receiving seismic data that is produced in response to a seismic survey of a prospect in a subterranean formation, wherein the seismic data is indicative of a plurality of anomalies in the prospect, and wherein the prospect includes a plurality of segments;
computing prior probabilities of success and failure scenarios for at least one of the segments;
determining likelihoods of the anomalies given the success and failure scenarios for the at least one of the segments;
classifying at least two of the segments as part of a direct fluid indicator dependency group;
determining a degree of correlation between the anomalies for the direct fluid indicator dependency group;
determining a posterior chance of success for the prospect based at least in part on the degree of correlation between the anomalies; and
updating a model of the subterranean formation based at least in part on the posterior chance of success for the prospect, wherein the model is configured to be used to determine a presence of hydrocarbons in one or more of the segments in the prospect in the subterranean formation.

32. The computer-readable medium of claim 31, wherein the operations further comprise:
sampling a first of the seismic anomalies for the direct fluid indicator dependency group using one or more of the prior probabilities of success and failure scenarios for a first of the segments; and
sampling remaining seismic anomalies using one or more of the prior probabilities of success and failure scenarios for a second of the segments and using the degree of correlation within the direct fluid indicator dependency group.

33. The computer-readable medium of claim 32, wherein the operations further comprise:
determining a first number of samples where all of the anomalies are present; and
determining a second number of samples that have a success scenario in at least one of the segments, wherein the second number of samples is selected from the first number of samples.

34. The computer-readable medium of claim 33, wherein the posterior chance of success is determined at least partially by a quotient between the second number of samples and the first number of samples.

35. The computer-readable medium of any of claims 32-34, wherein the operations further comprise defining geological risk dependencies existing among the segments.

36. The computer-readable medium of claim 31, wherein the operations further comprise defining geological risk dependencies existing among the segments.

37. The computer-readable medium of claim 36, wherein the operations further comprise:
- sampling a first of the anomalies for each direct fluid indicator dependency group using one or more of the prior probabilities of success and failure scenarios for a first of the segments; and
- sampling remaining anomalies using one or more of the prior probabilities of success and failure scenarios for a second of the segments and using the degree of correlation within the direct fluid indicator dependency group.

38. The computer-readable medium claim 36, wherein the operations further comprise:
- determining a first number of samples where all of the anomalies are present; and
- determining a second number of samples that have a success scenario in at least one of the segments, wherein the second number of samples is selected from the first number of samples.

* * * * *